350-319 SR
11/22/77 OR 4,059,347

United States Patent [19]
Eitel

[11] 4,059,347
[45] Nov. 22, 1977

[54] OPTICAL INSTRUMENT AND VIEWING METHOD

[76] Inventor: Richard P. Eitel, 2711 Taylor Drive, Everett, Wash. 98203

[21] Appl. No.: 689,182

[22] Filed: May 24, 1976

[51] Int. Cl.² ............................................. G02B 5/00
[52] U.S. Cl. ................................. 350/319; D2/234; 33/262; 351/45
[58] Field of Search ................. 350/319, 44; 351/44, 351/45, 2; D2/234, 10-15; D10/1; 128/76.5; 33/262, 46 G; 356/247

[56] References Cited
U.S. PATENT DOCUMENTS

| | | | |
|---|---|---|---|
| 1,568,900 | 1/1926 | Metcalf | 351/45 |
| 1,676,760 | 7/1928 | Wilson | 351/45 |
| 1,752,889 | 4/1929 | Cornwell et al. | 351/45 |
| 1,882,909 | 10/1932 | Rhue | 351/45 |
| 2,409,356 | 10/1944 | Hutchings | 351/45 |
| 2,511,776 | 6/1960 | Kelly | 351/45 |
| 3,689,136 | 9/1972 | Altamian | 351/45 |
| D. 132,297 | 5/1942 | Hubert | D2/234 |
| D. 157,083 | 1/1950 | Paulson | D2/234 |
| D. 175,469 | 8/1958 | Ives | D2/234 |

*Primary Examiner*—John K. Corbin
*Assistant Examiner*—S.W. delos Reyes
*Attorney, Agent, or Firm*—Seed, Berry, Vernon & Baynham

[57] ABSTRACT

A see-through zone is provided of a shape and size so that the horizontal end portions of the zone will merge as an image defining a target frame into which the user can center a stationary or moving target by keeping his line of sight properly on the target.

12 Claims, 6 Drawing Figures

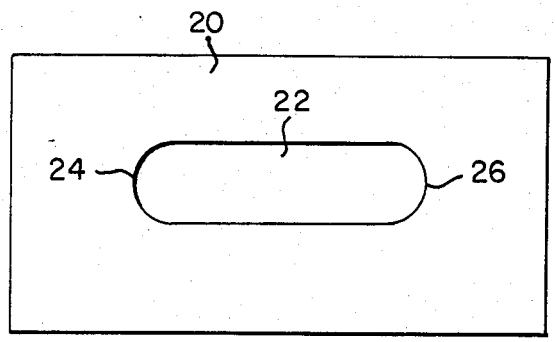
FIG. 1
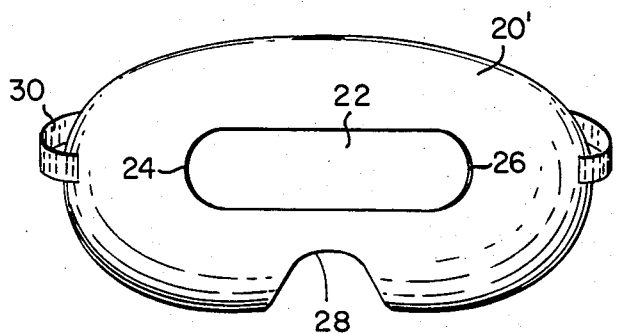
FIG. 2
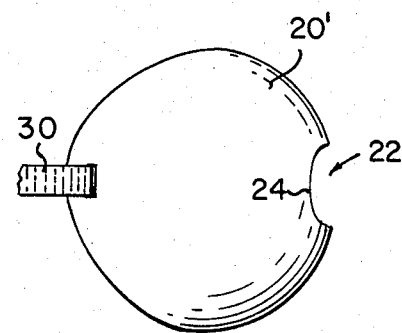
FIG. 3
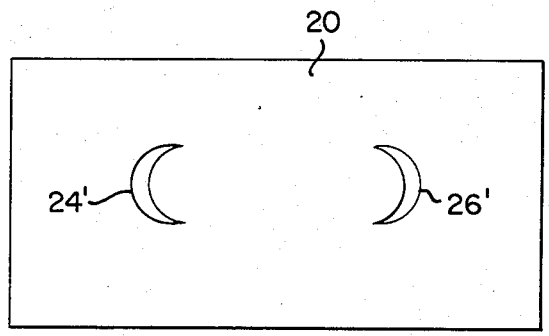
FIG. 4
FIG. 5
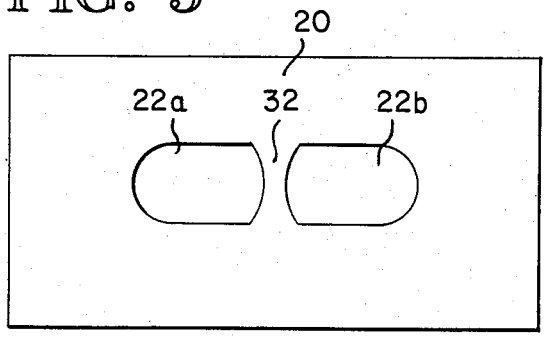
FIG. 6
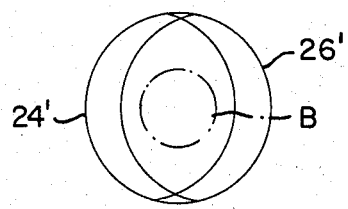

OPTICAL INSTRUMENT AND VIEWING METHOD

BACKGROUND OF THE INVENTION

This invention relates to optical instruments and, more particularly, to a viewing device and method for aiding individuals to concentrate their vision on an object.

"Keeping one's eye on the ball" is a well known adage applicable to a great variety of sports activities and assembly operations where good hand and eye coordination are required for superior performance whether the target of activity be moving as in tennis or stationary as in golf. When the target is moving, such as to require the head to be moved as well as the eyes, as is common in tennis, the degree of concentration required to properly perform is particularly acute. It is well recognized that visual concentration training is required for many persons to better their skills, but heretofore devices aimed to fill this need have generally been cumbersome or ineffective.

SUMMARY OF THE INVENTION

The principal object of this invention is to provide an improved method and apparatus for developing visual concentration on both stationary and moving objects.

Another object of the invention is to provide an effective visual concentration training device which is of simple and economical construction, light in weight, comfortable to wear and easy to use.

A further object of the invention is to provide such a device which can be adapted to individuals having varying degrees of difficulty in concentrating their vision on an object.

These and other aims of the present invention are accomplished by forming as a visual image a substantially closed target frame within which the user attempts to establish and maintain a stationary or moving object. The target outline if formed as the projected image of accented end portions of a horizontally elongated see-through zone in a head mount or mask. These end portions appear to horizontally merge and vertically expand due, it is believed, to phenomena hereinafter termed "second degree fusion" and "vertical proximity expansion". Before providing a detailed description of the invention, an explanation of these coined terms will now be undertaken.

If a person positions a pair of pencils, for example, in vertical spaced relation about two inches apart and centered in front of his eyes about a foot away, and then gradually moves the pencils toward his face while binocularly focusing in the distance between the pencils, he will experience fusion of the pencils as they approach, i.e., a convergence or blending of the retinal images of the pencils, while at the same time viewing more distant objects in a normal way. This fusion phenomenon experienced with the pencils will be termed second degree fusion in this description to distinguish from the normal first degree fusion experienced in binocular vision.

If the pencils are then shifted to the horizontal in the same vertical plane and the experiment is repeated, the pencils will appear to spread apart as they approach. This spreading phenomenon will appear more pronounced if the pencils are initially placed closer together, as for example, an inch apart, and occurs with monocular as well as binocular vision. It can also be observed in conjunction with second degree fusion if the pencils are moved in vertical relation about an inch apart. In the latter instance the observer will see a central merged image of the pencils by second degree fusion and simultaneously see a spread image of the pencils spaced to the right and left of the merged image. For purposes of this description the aforesaid spreading phenomenon will be termed "proximity expansion". When the proximity expansion is experienced up and down, it will be termed "vertical proximity expansion" whereas when it is experienced right and left it will be termed "lateral proximity expansion".

By the present invention second degree fusion and vertical proximity expansion are utilized to visually form a target frame image along a line of sight which can be kept directed on a given target, such as a tennis ball, for example, so that the target is centered in the target frame. In this manner emphasis is placed on visual concentration on the target which through practice may become a sustained ability when use of the training process is terminated.

As previously indicated, in accordance with this invention the target frame is formed as the image of end portions of a see-through zone. In the preferred embodiment these end portions are generally U-shaped and are horizontally apart approximately the pupillary spacing, normally about three inches, so that second degree fusion will be experienced. They are preferably spaced apart far enough so that lateral proximity expansion images of the end portions will not be experienced when the target frame is seen. Also, it is preferred to have the see-through zone at the end portions narrow enough vertically (about an inch wide) so that a vertical spreading of the U-shape of the end portions is experienced by vertical proximity expansion when the end portions laterally appear to merge by second degree fusion.

BRIEF DESCRIPTION OF THE FIGURES OF THE DRAWING

FIG. 1 illustrates one form of see-through zone;

FIG. 2 is a front elevation view of a goggle-like mount to provide the see-through zone of FIG. 1;

FIG. 3 is a side elevational view of the mount of FIG. 2;

FIGS. 4 and 5 show alternative arrangements to provide the see-through zone; and FIG. 6 illustrates the target frame formed when the embodiment of FIG. 4 is used.

DETAILED DESCRIPTION OF THE INVENTION

As indicated in FIG. 1, in its simplest form the present invention comprises a sheet 20 having an elongated horizontal slot (cutout) 22 with parallel longitudinal edges and rounded right and left end portions 24,26 spaced apart approximately the distance between the pupils in a human's eyes, and namely three inches. In this regard, second degree fusion can normally be experienced when the spacing of the end portions 24,26 is slightly greater than the pupillary center-to-center distance as well as equal to or less than such distance. The slot preferably has a height (width) of about one inch and becomes a see-through zone in the use of the device. When slot 22 is centered horizontally about 2½ inches in front of the eyes, and the observer focuses in the distance through the slot, he will see an image in which the curved end portions of the slot appear to have moved together (second degree fusion) and widened vertically (vertical proximity expansion), thereby giving a generally circular image frame, hereinafter referred to as the "target frame" because the observer can focus on an object (target) in the distance at the same time as he sees the target frame and can center the object within the frame. If the target is a ball moving toward the observer, he can continue to concentrate his vision on the ball while keeping it visually within the target frame formed as an image of the end portions of the see-through zone.

In order to head mount the sheet 20 and keep the see-through zone in proper physical relationship to the user (trainee), it is preferred, as shown in FIG. 2, to form the sheet into a concavo-convex configuration 20' and provide a nose cutout 28 or rib so that the device is shaped similarly to a one-piece goggle or a masquerade mask and can be worn in the same manner with an elastic head band or adjustable strap 30. Other securing means such as eyeglass sidepieces, flexible sweatbands, visor attachments, and head clips can also be used.

The end portions 24,26 of the see-through zone should be accented, and this can be accomplished in several ways. For example, if the sheet 20 is opaque or of sufficiently tinted or translucent plastic or glass, and the see-through zone comprises the slot 22, or an equivalent clear transparent area, the end portions of the border of the slot or transparent area will be clearly enought defined to be visible for an image by second degree fusion.

As illustrated in FIG. 4, the sheet 20 can have U-shaped dark markers 24',26' painted or otherwise placed thereon to serve as transition zones defining the end portions of the see-through zone with or without use of the slot 22. In this instance the entire mount, other than the marked portions 24',26' can be clear or tinted for eye protection against the sun. This arrangement has the advantage for some applications of maintaining peripheral vision. If desired, varying degrees of translucency can be provided leading to the see-through zone from the outer surrounding zone.

It is preferred that the entire see-through zone be given the same treatment, i.e., not be interrupted by change in color or degree of transparency. However, this is not essential for all applications of the invention. For example, if the center portion of the see-through zone, corresponding approximately to the bridge of the nose, is filled by a nontransparent bridge 32 as shown in FIG. 5, thereby making a pair of sub-zones 22a, 22b, the visual effect will still be for the user to see the target frame defined by the curved outer end portions of the sub-zones, but the user will also see images of the bridge 32 at both sides of the target frame. If the material forming the bridge 32 is identical to that in the rest of the mount, or is more transparent, the aforesaid images at the sides of the target frame will not be apparent enough to be objectionable to many users. For this reason the present invention contemplates such an arrangement as an alternative to the preferred form, and the term "see-through zone" when appearing in the annexed claims is intended, unless specifically qualified, to include such a right and left pair of see-through sub-zones separated by a bridge.

It is not intended to be implied from FIGS. 1 and 4 that the see-through zone 22 or the markers 24',26' need be planar. In fact, it will be seen by reference to FIG. 3, which is a side elevation of the goggle embodiment of FIG. 2, that the border of the slot 23 is not planar, and that if the markers 24',26' were incorporated in the goggle without a slot, the see-through zone would not be planar. Also, other head-mounted devices can be utilized to provide or carry the see-through zone, as for example, a visor or cap, or an attachment thereto.

In the practice of the invention, the user or trainee places the see-through zone 22 about 2 or 3 inches from the eyes. When the zone is provided by a suitable mount, as in FIG. 2, the proper spacing is provided and maintained. The user then looks through the see-through zone along a forward line of sight and sees an image of the U-shaped end portions 24,26 of the zone. In this image these end portions are merged and vertically expanded to give an enlarged generally circular target frame. For example, if the see-through zone is defined by the markers 24',26' (FIG. 4), the resulting target frame will have the general appearance shown in FIG. 6. Then if the user, with the target frame image in view, focuses and zeros in on an object, such for example as an approaching tennis ball, he can move his head if necessary to register his line of sight with the ball target and keep it centered within the target frame as indicated by the phantom outline of ball B in FIG. 6. In any regard, the constant awareness of the target frame image and the objective of keeping the target centered therein, helps to emphasize and develop concentration by the user on the target. Normally, improved concentration will result which will carry over after training sessions with the device have ceased.

The length of the see-through zone can be varied as long as it does not so exceed the pupillary distance that second degree fusion cannot be experienced. If it is shortened too much the lateral proximity expansion effect will be experienced in addition to second degree fusion. Similarly, the vertical width of the see-through zone can be varied. In the extreme, the end portions 24,26 become straight parallel lines and the see-through zone becomes vertically infinite. In that instance, the straight portions would merge into a single line by second degree fusion. Although a target frame in the form of a vertical center line may be of concentration assistance in some applications it is preferred to have a generally round target frame. This is achieved when the see-through zone is given a width of about one inch and a length of about three inches. However, these dimensions are by way of example, and are not intended as a limitation.

The embodiments of the invention in which a particular property or privilege is claimed are defined as follows:

1. An optical device for aiding an individual wearing the device to concentrate his vision on an object, said device comprising:

a head mount having a horizontal see-through zone with outwardly curved, clearly defined ends spaced apart horizontally about three inches to approximate the pupillary distance of the viewer and extending over a vertical distance sufficient for vertical proximity expansion, said zone having a vertical width through most of its horizontal length as great as at said outwardly curved ends, and means for positioning said head mount with said zone centered in front of the viewer's eyes at a distance therefrom such that said outwardly curved ends horizontally approach each other by second degree fusion and vertically elongate by vertical proximity expansion whereby said ends are seen as a generally circular image when the viewer looks through said zone.

2. An optical device according to claim 1 in which said head mount has a pair of horizontally spaced narrow transition zones outlining said outwardly curved ends and has an outer zone merging with said transition zones and see-through zone.

3. An optical instrument according to claim 2 in which said outer zone is less transparent than said see-through zone and more translucent than said transition zones.

4. An optical instrument according to claim 2 in which said outer zone is substantially transparent.

5. An optical instrument according to claim 2 in which said outer zone is translucent.

6. An optical instrument according to claim 2 in which said transition zone and outer zones are equally translucent.

7. An optical instrument according to claim 2 in which said outer zone is transparent and tinted.

8. An optical instrument according to claim 1 in which said see-through zone comprises an open slot.

9. An optical instrument according to claim 1 in which said transition zones each have a concave-convex configuration.

10. An optical device according to claim 1 in which said see-through zone is interrupted in the center.

11. An optical device for aiding an individual wearing the device to concentrate his vision on an object, said device comprising:
viewing means having a horizontal see-through zone therein with clearly defined generally U-shaped ends spaced apart horizontally about three inches to approximate the pupillary distance of the viewer and having a vertical width through most of its horizontal length of about an inch, and
head mounting means for positioning said viewing means with said zone centered in front of the viewer's eyes at a distance therefrom such that said generally U-shaped ends are jointly seen as a central image when the viewer looks through said zone.

12. An optical device according to claim 11 in which the top and bottom of said see-through zone are also clearly defined.

* * * * *